US011907908B2

(12) United States Patent
Boeker

(10) Patent No.: US 11,907,908 B2
(45) Date of Patent: Feb. 20, 2024

(54) METHOD AND SYSTEM FOR ASCERTAINING INFORMATION RELATING TO A COLLECTION, A START AND/OR AN END OF A PERIOD SPENT IN A WORKSHOP AND/OR IN STORAGE AND/OR A DELIVERY OF A GREEN SPACE AND/OR CULTIVATED AREA TREATMENT DEVICE

(71) Applicant: Andreas Stihl AG & Co. KG, Waiblingen (DE)

(72) Inventor: Robert Boeker, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 49 days.

(21) Appl. No.: 17/644,922

(22) Filed: Dec. 17, 2021

(65) Prior Publication Data

US 2022/0198395 A1 Jun. 23, 2022

(30) Foreign Application Priority Data

Dec. 18, 2020 (EP) .................................... 20215420

(51) Int. Cl.
*G06Q 10/10* (2023.01)
*G06Q 10/0631* (2023.01)
*G06Q 10/109* (2023.01)
*G06Q 50/02* (2012.01)
*G06Q 50/28* (2012.01)
*G06Q 10/083* (2023.01)
*G06Q 10/04* (2023.01)

(52) U.S. Cl.
CPC .......... *G06Q 10/103* (2013.01); *G06Q 10/04* (2013.01); *G06Q 10/0631* (2013.01); *G06Q 10/083* (2013.01); *G06Q 10/109* (2013.01); *G06Q 50/02* (2013.01); *G06Q 50/28* (2013.01)

(58) Field of Classification Search
CPC .. G06Q 10/103; G06Q 10/04; G06Q 10/0631; G06Q 10/083; G06Q 10/109; G06Q 50/02; G06Q 50/28; G06Q 10/20; G06Q 10/087
See application file for complete search history.

(56) References Cited

U.S. PATENT DOCUMENTS

2019/0304211 A1 10/2019 Shimamura et al.
2019/0320580 A1 10/2019 Haneda et al.
2021/0073540 A1* 3/2021 Tran ...................... B64U 10/10

FOREIGN PATENT DOCUMENTS

WO WO 2018/123629 A1 7/2018

OTHER PUBLICATIONS

German-language European Search Report issued in European Application No. 20215420.9 dated Apr. 23, 2021 with partial English translation (13 pages).

* cited by examiner

*Primary Examiner* — Tejal Gami
(74) *Attorney, Agent, or Firm* — Crowell & Moring LLP

(57) ABSTRACT

A method and system ascertain information relating to a collection, a start and/or an end of a period spent in a workshop and/or in storage and/or a delivery of a green space and/or cultivated area treatment device. The method involves the steps of: providing a growth characteristic variable, wherein the growth characteristic variable is characteristic for plant growth on and/or in a space/area treated and/or to be treated by way of the green space and/or cultivated area treatment device; and ascertaining the information on the basis of the provided growth characteristic variable.

12 Claims, 2 Drawing Sheets

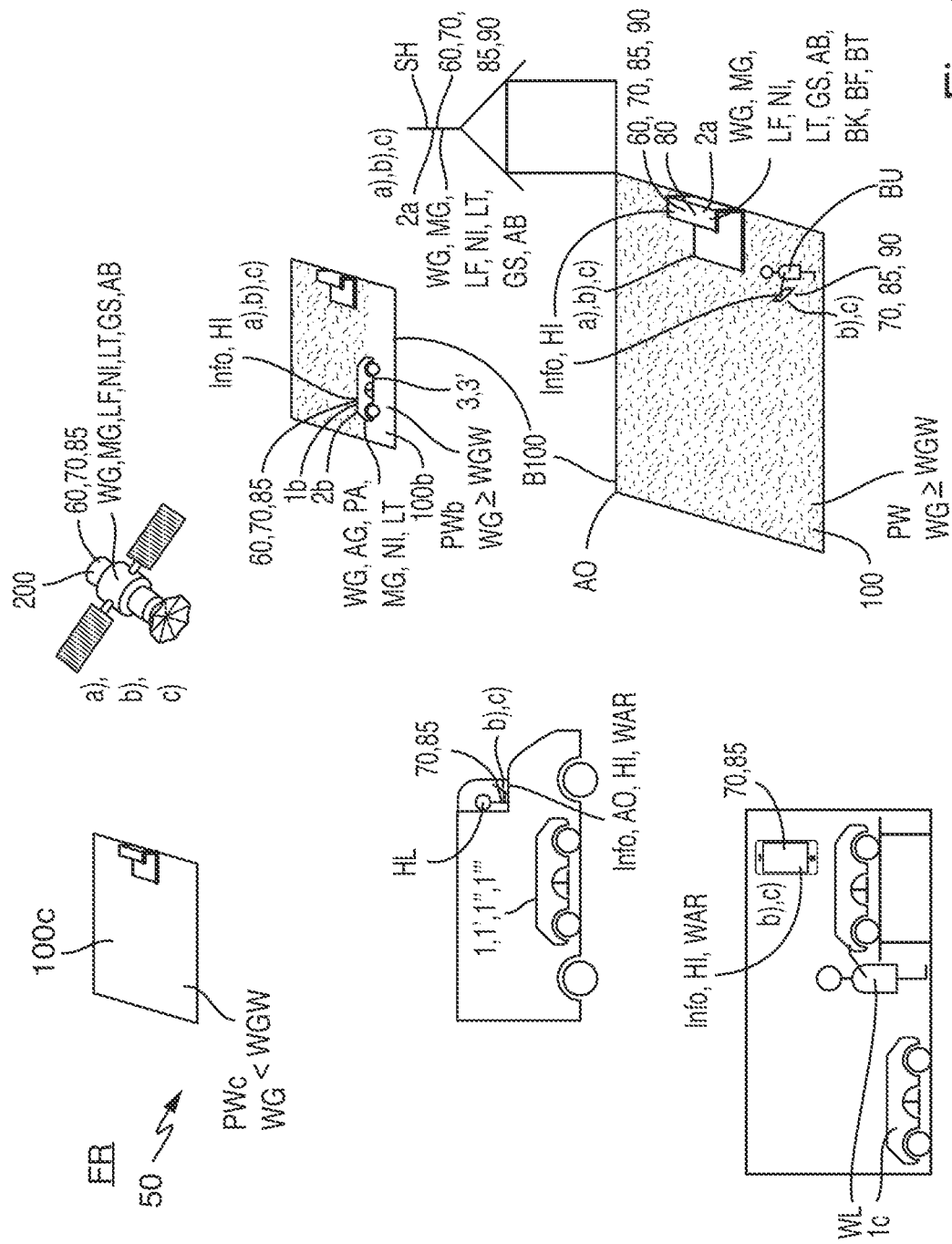

METHOD AND SYSTEM FOR ASCERTAINING INFORMATION RELATING TO A COLLECTION, A START AND/OR AN END OF A PERIOD SPENT IN A WORKSHOP AND/OR IN STORAGE AND/OR A DELIVERY OF A GREEN SPACE AND/OR CULTIVATED AREA TREATMENT DEVICE

CROSS REFERENCE TO RELATED APPLICATION

This application claims priority under 35 U.S.C. § 119 from European Patent Application No. 20215420.9, filed Dec. 18, 2020, the entire disclosure of which is herein expressly incorporated by reference.

BACKGROUND AND SUMMARY OF THE INVENTION

The invention relates to a method and a system, in particular each, for ascertaining information relating to a collection, a start and/or an end of a period spent in a workshop and/or in storage and/or a delivery of a green space and/or cultivated area treatment device.

The invention is based on the problem of providing a method and a system, in particular each, for ascertaining information relating to a collection, a start and/or an end of a period spent in a workshop and/or in storage and/or a delivery of a green space and/or cultivated area treatment device, which, in particular each, have improved properties and/or improved functionalities.

The invention solves the problem by providing a method and a system in accordance with the independent claims. Advantageous developments and/or embodiments of the invention are described in the dependent claims.

The in particular automatic method according to the invention is designed or configured or intended to in particular automatically ascertain or trigger information, in particular authorization information, relating to or for or about a collection, a start and/or an end of a period spent in a workshop and/or in storage and/or a delivery of a green space and/or cultivated area treatment device. The method comprises or involves the steps of: a) providing, in particular automatically providing, a growth characteristic variable, in particular a value of the growth characteristic variable, in particular repeatedly or regularly or at regular time intervals. The growth characteristic variable is characterizing or characteristic or descriptive of plant growth, in particular a value of the plant growth, on and/or in a space/area, in particular green space and/or cultivated area, treated and/or to be treated by way of the green space and/or cultivated area treatment device, in particular identifies or characterizes or describes the plant growth. b) Ascertaining, in particular automatically ascertaining, or determining the information, in particular a value of the information, on the basis of or based on the provided growth characteristic variable, in particular repeatedly or regularly or at regular time intervals.

This allows in particular in each case optimum timing or an in particular in each case correct time of collection, start and/or end of the period spent in a workshop and/or in storage and/or delivery of the green space and/or cultivated area treatment device, in particular adapted to the plant growth.

In addition to or as an alternative, this allows optimum use of an in particular respective and/or limited capacity of a courier and/or delivery service and/or of a workshop and/or warehouse operator. This is in particular the case against the background that respective plant growth on and/or in spaces/areas treated and/or to be treated by way of green space and/or cultivated area treatment devices is generally different, in particular over time, in particular ends and/or starts, in particular at different locations or in different regions, in particular over the course of a year. The collections, the starts and/or the ends of the periods spent in a workshop and/or in storage and/or the deliveries of the green space and/or cultivated area treatment devices are thus generally different or distributed, in particular temporally, over different dates and times. This thus makes it possible to increase the efficiency of the courier and/or delivery service and/or of the workshop and/or warehouse operator.

The collection and/or the delivery of the green space and/or cultivated area treatment device may in particular be referred to as transport. In addition or as an alternative, the collection may be from the space/area and/or to a workshop and/or a warehouse, in particular for the period spent in a workshop and/or in storage. Again in addition or as an alternative, the delivery may be from a, in particular the, workshop and/or a, in particular the, warehouse, in particular for the period spent in a workshop and/or in storage, and/or to the space/area. Again in addition or as an alternative, a, in particular the, workshop and/or a, in particular the, warehouse or the period spent in a workshop and/or in storage might not be in one region or remote from the space/area. Again in addition or as an alternative, the period spent in a workshop and/or in storage may last several days, in particular weeks, in particular in terms of time. Again in addition or as an alternative, the period spent in a workshop and/or in storage may involve or comprise cleaning, maintenance and/or repair and/or warehousing and/or relocation of the green space and/or cultivated area treatment device.

The green space and/or cultivated area treatment device may have a mass of at most 200 kg (kilograms), in particular at most 100 kg, in particular at most 50 kg, in particular at most 20 kg, and/or at least 1 kg, in particular at least 2 kg, in particular at least 5 kg, in particular at least 10 kg. In addition or as an alternative, the green space and/or cultivated area treatment device may be a ground-guided or manually guided green space and/or cultivated area treatment device. Again in addition or as an alternative, the green space and/or cultivated area treatment device may be a gardening and/or soil treatment device. Again in addition or as an alternative, the green space and/or cultivated area treatment device may comprise a drive, in particular a tool drive. The drive may in particular comprise, in particular be, an electromotive drive and/or a combustion engine drive. Again in addition or as an alternative, the green space and/or cultivated area treatment device may comprise a treatment tool, in particular able to be driven by the tool drive, for treating the space/area.

The space/area may be an open space/area, in particular unsealed soil, or a green space/area, such as a meadow or a lawn or grassy space/area, or an in particular green roof, in particular a roof surface, or an in particular green facade, in particular a facade surface.

The plant growth may be growth or an increase in the size of a plant, in particular a herbaceous and/or cultivated plant, in particular a grass plant.

Step b) may involve: ascertaining the plant growth on the basis of or based on the growth characteristic variable, in particular by way of a plant growth model, and ascertaining the information on the basis of the ascertained plant growth. The plant growth model may in particular comprise a table, a mathematical formula, an estimate based on empirical values and/or a simulation.

Step b) may be performed after step a) in time.

In a development of the invention, the method comprises or involves the step of: c) transmitting, in particular automatically transmitting, and/or outputting, in particular automatically outputting, the ascertained information, in particular to a, in particular the, courier and/or delivery service for the green space and/or cultivated area treatment device or an in particular electrical service terminal of the courier and/or delivery service and/or by way of the service terminal, a, in particular the, workshop and/or warehouse operator for the green space and/or cultivated area treatment device or an in particular electrical operator terminal of the workshop and/or warehouse operator and/or by way of the operator terminal and/or a user or end client or operator of the green space and/or cultivated area treatment device or an in particular electrical user terminal of the user and/or by way of the user terminal, in particular when the information changes. This allows the information to be perceived. In addition or as an alternative, this makes it possible to increase the efficiency of the courier and/or delivery service and/or of the workshop and/or warehouse operator and/or allows a high degree of user friendliness. Step c) may be in particular performed after step b) in time. In addition or as an alternative, the transmitting may be wireless and/or wired. Again in addition or as an alternative, the output may be optical, acoustic and/or haptic. Again in addition or as an alternative, the transmitting and/or the outputting to the courier and/or delivery service and/or the workshop and/or warehouse operator may be specified or input or authorized by the user, in particular in a standard manner or on a blanket basis.

In an embodiment of the invention, the method comprises or involves in particular the step of: releasing, in particular automatically releasing, delaying, in particular automatically delaying, and/or blocking, in particular automatically blocking, the transmitting and/or the outputting of the ascertained information to the courier and/or delivery service or the service terminal and/or by way of the service terminal and/or the workshop and/or warehouse operator or the operator terminal and/or by way of the operator terminal on the basis of an input or specification by the user or the user terminal, in particular at a time after the transmitting and/or the outputting of the ascertained information to the user or the user terminal and/or by way of the user terminal. This makes it possible to take into consideration in particular only what is known to the user, in particular, and what is unknown to the courier and/or delivery service and/or to the workshop and/or warehouse operator. This, in particular this step, may in particular be specified or input by the user, in particular manually. In addition or as an alternative, the delay may be by several days, in particular weeks.

In a development of the invention, step b) comprises or involves: ascertaining the information relating to the collection and/or the start of the period spent in a workshop and/or in storage if the provided growth characteristic variable is characterizing or characteristic or descriptive of the plant growth falling below a growth limit value, in particular if the growth characteristic variable and/or the plant growth fall/falls below the growth limit value, in particular, and not doing so if not. In addition or as an alternative, step b) comprises or involves: ascertaining the information relating to the end of the period spent in a workshop and/or in storage and/or the delivery if the provided growth characteristic variable is characterizing or characteristic or descriptive of the plant growth reaching and/or exceeding a, in particular the, growth limit value, in particular if the growth characteristic variable and/or the plant growth reach/reaches and/or exceed/exceeds the growth limit value, in particular, and not doing so if not. This allows in particular in each case optimum timing or an in particular in each case correct time of collection and/or start of the period spent in a workshop and/or in storage for the green space and/or cultivated area treatment device, in particular adapted to a small amount of or low or no plant growth or an end of the plant growth, in particular for the year. In addition or as an alternative, this allows in particular in each case optimum timing or an in particular in each case correct time of the end of the period spent in a workshop and/or in storage and/or the delivery of the green space and/or cultivated area treatment device, in particular adapted to a large amount of or high plant growth or a start of the plant growth, in particular for the year. The growth limit value may in particular be individually inputtable or specifiable, in particular be input or specified, in a variable or individual manner by a, in particular the, user of the green space and/or cultivated area treatment device or the user terminal for the green space and/or cultivated area treatment device and/or the space/area.

The green space and/or cultivated area treatment device may in particular be for sowing, fertilizing and/or watering the space/area.

In a development of the invention, the green space and/or cultivated area treatment device is an autonomous mobile green space and/or cultivated area treatment robot. In addition or as an alternative, the green space and/or cultivated area treatment device is a lawnmower, in particular an autonomous mobile robotic lawnmower, and/or a tiller. In particular in the case of the green space and/or cultivated area treatment robot, it may be the case that a, in particular the, user does not monitor, in particular does not want to monitor, the plant growth. The method may thus be particularly advantageous in the case of the green space and/or cultivated area treatment robot. In addition or as an alternative, a lawn or grass and/or soil growth might regularly be alternately small or end and be alternately large or start, in particular from year to year, but also not at the same location, in particular from year to year, in particular at the in particular in each case respective same date or time. The method may thus be particularly advantageous in the case of the lawnmower and/or the tiller. Autonomous may in particular mean that the green space and/or cultivated area treatment robot is able to move and/or act on the space/area independently, on its own, in a self-determined and/or self-controlled manner and/or independently of a, in particular the, user and/or select at least one parameter, such as in particular a route parameter, and/or a turnaround point. In addition or as an alternative, autonomous may mean that the green space and/or cultivated area treatment robot is able to start and/or end a treatment on its own. Again in addition or as an alternative, in the case of the autonomous treatment, the green space and/or cultivated area treatment robot does not need to or might not be monitored and/or controlled, in particular remotely controlled, by the user. In other words in the case of the autonomous treatment, the green space and/or cultivated area treatment robot is able to work without human monitoring and/or control and/or guidance. Again in addition or as an alternative, the green space and/or cultivated area treatment robot may be a service robot and/or a service-providing robot. Again in addition or as an alternative, the lawnmower may be a mulching mower. Again in addition or as an alternative, a lawn-mowing tool of the lawnmower may comprise at least one mowing cord, at least one plastic blade, at least one metal blade and/or one metal cutting blade having at least one cutting edge and/or having at least one cutting tooth. Again in addition or as an alternative, a, in particular the, lawn-mowing tool of the lawnmower may be a rotating lawn-mowing tool and be designed to mow a material to be mowed in what is known as a free-cutting process without counter-cutting.

In a development of the invention, step a) comprises or involves: detecting, in particular automatically detecting, the growth characteristic variable, in particular the value of the growth characteristic variable, by way of an in particular electrical growth characteristic variable sensor in a, in particular the, region or locally, in particular at and/or on and/or in the space/area. This allows a high degree of distinctiveness for the growth characteristic variable. This thus allows the information to be ascertained accurately. In the region of the space/area may in particular mean at most 200 m (metres), in particular at most 100 m, in particular at most 50 m, in particular at most 20 m, away from the space/area. In addition or as an alternative, the growth characteristic variable sensor may be part of a smart home, in particular of a weather station of the smart home. Again in addition or as an alternative, the growth characteristic variable sensor may be part of an in particular electrical charging station for in particular electrically charging the green space and/or cultivated area treatment device, in particular the green space and/or cultivated area treatment robot, in particular with drive energy, and/or, in particular at least, be arranged, in particular fastened, on the charging station. Again in addition or as an alternative, step b) may involve: ascertaining the information on the basis of the detected growth characteristic variable.

In a development, in particular an embodiment, of the invention, step a) comprises or involves: detecting, in particular automatically detecting, the growth characteristic variable, in particular the value of the growth characteristic variable, by way of a, in particular the and/or electrical, growth characteristic variable sensor of a, in particular the, green space and/or cultivated area treatment device, in particular on and/or in the space/area. This allows a high degree of distinctiveness for the growth characteristic variable. This thus allows the information to be ascertained accurately. The acquisition may in particular be performed during a, in particular the, treatment of the space/area. In addition or as an alternative, step b) may involve: ascertaining the information on the basis of the detected growth characteristic variable.

In an embodiment of the invention, step a) comprises or involves: detecting the growth characteristic variable by way of the growth characteristic variable sensor of a further green space and/or cultivated area treatment device, in particular on and/or in a further space/area in the region of the space/area. Step b) in particular comprises or involves: ascertaining the information, in particular relating to the end of the period spent in a workshop and/or in storage and/or the delivery, on the basis of the detected growth characteristic variable. This means that it is possible for the, in particular one, green space and/or cultivated area treatment device not to have to include or not to include a growth characteristic variable sensor and/or to be able to be, in particular still, kept or located in the workshop and/or the warehouse and/or that it does not need to or might not, in particular not yet, be delivered. A period spent in a workshop and/or in storage for the further green space and/or cultivated area treatment device may in particular already have ended and/or the further green space and/or cultivated area treatment device may already be delivered. In addition or as an alternative, the further green space and/or cultivated area treatment device may be referred to as reference green space and/or cultivated area treatment device. Again in addition or as an alternative, the further space/area may be referred to as a reference space/area. Again in addition or as an alternative, the, in particular one, green space and/or cultivated area treatment device and the further green space and/or cultivated area treatment device may be of the same type. Again in addition or as an alternative, the, in particular one, space/area, in particular plants on and/or in the space/area, and the further space/area, in particular further plants on and/or in the further space/area, may be of the same type, in particular of the same sort.

In an embodiment of the invention, an in particular relatively large amount of plant growth, in particular still and/or briefly or for a few days, has been detected, in particular over time, by way of the growth characteristic variable sensor of the further green space and/or cultivated area treatment device after a smaller amount or low or no, in particular no further, plant growth has been detected by way of an in particular electrical growth characteristic variable sensor of the green space and/or cultivated area treatment device. This makes it possible to determine or define the further green space and/or cultivated area treatment device as a reference green space and/or cultivated area treatment device and/or to determine or define the further space/area as a reference space/area, in particular newly from year to year.

In a development, in particular an embodiment, of the invention, the growth characteristic variable comprises or has a drive characteristic variable, in particular a value of the drive characteristic variable, in particular a power consumption, in particular a value of the power consumption, and/or a variable corresponding to the power consumption, in particular a value of the variable, of a, in particular the, drive, in particular a, in particular the, tool drive, of a, in particular the and/or further, green space and/or cultivated area treatment device. In addition or as an alternative, the growth characteristic variable comprises or has a meteorological characteristic variable, in particular a value of the meteorological characteristic variable, in particular an air humidity, in particular a value of the air humidity, an amount of precipitation, in particular a value of the amount of precipitation, an air temperature, in particular a value of the air temperature, a global radiation, in particular a value of the global radiation, and/or an albedo, in particular a value of the albedo, and/or a soil characteristic variable, in particular a value of the soil characteristic variable, in particular a soil moisture content, in particular a value of the soil moisture content, and/or a soil temperature, in particular a value of the soil temperature. Again in addition or as an alternative, the growth characteristic variable comprises or has an in particular meteorological and/or phenological season, in particular a value of the season, in particular spring and/or autumn. The power consumption or the variable may in particular be small if the plant growth is small or is ending. In addition or as an alternative, the power consumption or the variable may be large if the plant growth is large or is starting. Again in addition or as an alternative, the growth limit value may comprise a power consumption limit value. Again in addition or as an alternative, the power consumption or the variable may comprise a motor current and/or a torque, in particular a torque request. Again in addition or as an alternative, the drive may comprise, in particular be, a propellant drive for propelling the green space and/or cultivated area treatment device. Again in addition or as an alternative, the method, in particular the step, may involve: ascertaining, in particular detecting, a position of the space/area, in particular the region of the space/area, and/or of the green space and/or cultivated area treatment device, and providing, in particular ascertaining and/or receiving, the meteorological characteristic variable and/or the soil characteristic variable and/or the season on the basis of or based on the determined position. Again in addition or as an alternative, the plant growth may be influenced by and/or dependent on the meteorological characteristic variable and/or the soil characteristic variable and/or the season. Again in addition or as an alternative, the plant growth may be high or start in spring and/or the plant growth may be small or end in autumn. Again in addition or as an alternative, step b) may involve: ascertaining the information and/or the plant growth on the basis of or based on the drive characteristic variable and/or the meteorological characteristic variable and/or the soil characteristic variable and/or the season, in particular in combination or linked with one another. This may make it possible to ascertain the information, in particular as far as possible, without errors, for example when plant growth is low in summer due to dryness, in particular and the green space and/or cultivated area treatment device should not be collected and/or the period spent in a workshop and/or in storage should not start. Again in addition or as an alternative, the growth characteristic variable, in particular the drive characteristic variable and/or the meteorological characteristic variable and/or the soil characteristic variable and/or the season, may be current or up-to-date, in particular up-to-date for the week, in particular up-to-date for the day. Again in addition or as an alternative, the meteorological characteristic variable and/or the soil characteristic variable may be in the future or for the future or a forecast, in particular a weather forecast.

In a development of the invention, the growth characteristic variable is averaged, in particular automatically, over in particular at least several days, in particular weeks, in particular at most weeks, and/or several treatment processes or treatments of a, in particular the and/or further, space/area. This allows a high degree of distinctiveness for the growth characteristic variable and/or, in particular as far as possible, error-free ascertainment of the information. The growth characteristic variable may in particular be averaged over the space/area, in particular the region of the space/area and/or the further space/area.

In a development of the invention, the information comprises or has a route guide to a collection location for the collection and/or a delivery location for the delivery of the green space and/or cultivated area treatment device and/or an instruction, in particular a value of the instruction and/or a date or a time, concerning the start and/or the end of the period spent in a workshop and/or in storage, in particular the start, in particular a value of the start, and/or the end, in particular a value of the end, of the period spent in a workshop and/or in storage. This makes it possible to assist a, in particular the, courier and/or delivery service, a, in particular the, workshop and/or warehouse operator and/or a, in particular the, user of the green space and/or cultivated area treatment device. The collection location and the delivery location may in particular be different.

In a development of the invention, the method comprises or involves in particular the step of: ascertaining, in particular automatically ascertaining, or determining an in particular temporal workshop treatment and/or delivery sequence, in particular a value of the workshop treatment and/or delivery sequence, of workshop treatments and/or deliveries of green space and/or cultivated area treatment devices on the basis of, in particular opposite or reverse to, an in particular temporal growth sequence, in particular a value of the growth sequence, of a, in particular the, respective in particular temporally last plant growth on and/or in spaces/areas treated and/or to be treated by way of the green space and/or cultivated area treatment devices and/or an in particular temporal collection sequence, in particular a value of the collection sequence, of collections of the green space and/or cultivated area treatment devices and/or an in particular temporal start of a period spent in a workshop and/or in storage sequence, in particular a value of the start of a period spent in a workshop and/or in storage sequence, of starts of periods spent in a workshop and/or in storage for the green space and/or cultivated area treatment devices. This, in particular probably, allows an optimum and/or efficient process. The information may in particular comprise the ascertained workshop treatment and/or delivery sequence and/or be ascertained on the basis thereof or based thereon.

The in particular electrical system according to the invention is designed or configured in particular to ascertain and/or to automatically ascertain in particular the information relating to a, in particular the, collection, a, in particular the, start and/or a, in particular the, end of a, in particular the, period spent in a workshop and/or in storage and/or a, in particular the, delivery of a, in particular the, green space and/or cultivated area treatment device. The system comprises or has an in particular electrical provision unit and an in particular electrical ascertainment unit. The provision unit is designed or configured in particular to provide and/or to automatically provide a, in particular the, growth characteristic variable. The growth characteristic variable is characteristic for a, in particular the, plant growth on and/or in a, in particular the, space/area treated and/or to be treated by way of the green space and/or cultivated area treatment device. The ascertainment unit is in particular designed or configured to ascertain and/or to automatically ascertain the information on the basis of the provided growth characteristic variable.

The system may allow at least some or even all of the advantages as mentioned above for the method.

The system may in particular be designed or configured to in particular automatically perform a, in particular the, method mentioned above. In addition or as an alternative, the ascertainment unit may comprise, in particular be, a computing unit. Again in addition or as an alternative, the system may comprise an in particular electrical transmitting and/or output unit for transmitting, in particular the transmitting of, and/or for outputting, in particular the output of, the ascertained information. The output unit may in particular comprise a display, in particular a touch screen, a haptic display and/or a sound generator. Again in addition or as an alternative, the system may comprise the service terminal, the operator terminal and/or the user terminal. Again in addition or as an alternative, the system and/or the user terminal may comprise an in particular electrical input apparatus for the input by the user. The input apparatus may in particular comprise an input device, in particular a touch screen, a gesture recognition mechanism, a speech recognition mechanism and/or a keypad. Again in addition or as an alternative, the system may comprise the growth characteristic variable sensor.

In a development, the system comprises or has the green space and/or cultivated area treatment device and/or a, in particular the and/or electrical, charging station for in particular electrically charging the green space and/or cultivated area treatment device, in particular with drive energy. In particular, the green space and/or cultivated area treatment device and/or the charging station may, in particular each, be designed at least in part or even completely as mentioned above for the method. Again in addition or as an alternative, the green space and/or cultivated area treatment device and/or the charging station may, in particular each, comprise the provision unit and/or the ascertainment unit, in particular and the transmitting and/or output unit and/or the input apparatus and/or the growth characteristic variable sensor. Again in addition or as an alternative, the system may comprise the further green space and/or cultivated area treatment device.

Again in addition or as an alternative, the, in particular one, green space and/or cultivated area treatment device, the further green space and/or cultivated area treatment device, the growth characteristic variable sensor and/or the charging station may, in particular each, be used in a, in particular the, method as mentioned above.

Further advantages and aspects of the invention arise from the claims and from the description of exemplary embodiments of the invention, which are explained below on the basis of the figures.

BRIEF DESCRIPTION OF THE DRAWINGS

FIG. 2 shows a further schematic view of the system of FIG. 1 and a further flowchart of the method of FIG. 1, in particular for ascertaining information relating to an end of the period spent in a workshop and/or in storage and/or a delivery of the green space and/or cultivated area treatment device.

DETAILED DESCRIPTION OF THE DRAWINGS

Figure 1:
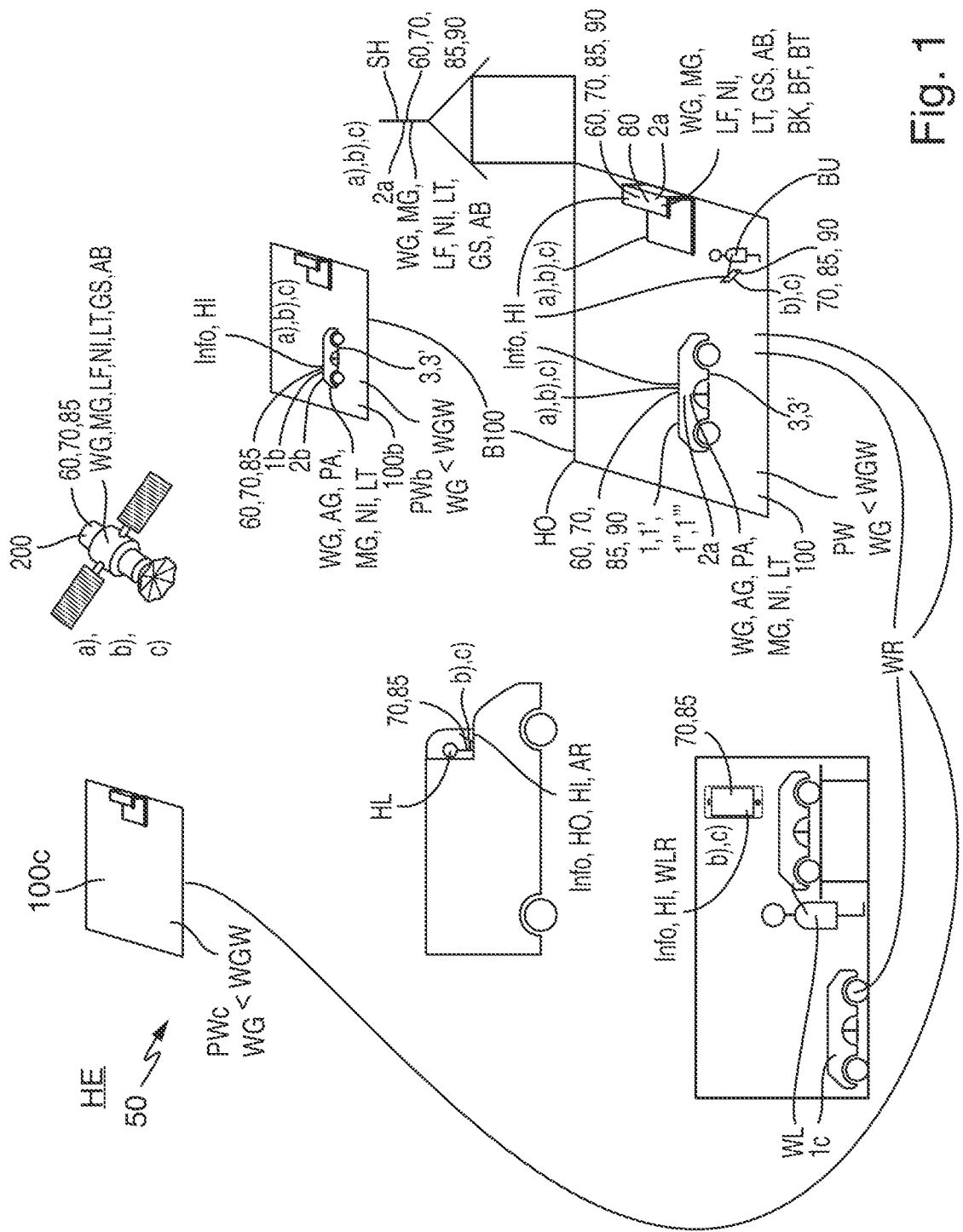
FIG. 1 shows a schematic view of a system according to an embodiment of the invention and a flowchart of a method according to an embodiment of the invention, in particular for ascertaining information relating to a collection and/or a start of a period spent in a workshop and/or in storage for a green space and/or cultivated area treatment device.

FIGS. 1 to 2 show a system 50 and a method for ascertaining information Info relating to a collection, a start and/or an end of a period spent in a workshop and/or in storage and/or a delivery of a green space and/or cultivated area treatment device 1.

The system 50 comprises in particular at least one provision unit 60 and in particular at least one ascertainment unit 70. The provision unit 60 is designed to provide, in particular provides, a growth characteristic variable WG. The growth characteristic variable WG is characteristic for plant growth PW on and/or in a space/area 100 treated and/or to be treated by way of the green space and/or cultivated area treatment device 1. The ascertainment unit 70 is designed to ascertain, in particular ascertains, the information Info on the basis of the provided growth characteristic variable WG.

The method involves the steps of: a) providing the growth characteristic variable WG, in particular by way of the provision unit 60. The growth characteristic variable WG is characteristic for the plant growth PW on and/or in the space/area 100 treated and/or to be treated by way of the green space and/or cultivated area treatment device 1; b) Ascertaining the information Info on the basis of the provided growth characteristic variable WG, in particular by way of the ascertainment unit 70.

In the exemplary embodiment shown, the system 50 comprises the green space and/or cultivated area treatment device 1 and/or a charging station 80 for charging the green space and/or cultivated area treatment device 1. In alternative exemplary embodiments, the system does not need to or might not comprise the green space and/or cultivated area treatment device and/or the charging station.

In the exemplary embodiment shown, the system 50 furthermore comprises in particular at least one transmitting and/or output unit 85 for transmitting and/or for outputting the ascertained information Info.

The method furthermore involves the step of: c) transmitting and/or outputting the ascertained information Info, in particular to a courier and/or delivery service HL, a workshop and/or warehouse operator WL and/or a user BU of the green space and/or cultivated area treatment device 1, in particular by way of the transmitting and/or output unit 85.

In detail, the method involves: releasing, delaying and/or blocking the transmitting and/or the outputting of the ascertained information Info to the courier and/or delivery service HL and/or the workshop and/or warehouse operator WL on the basis of an input by the user BU, in particular at a time after the transmitting and/or the outputting of the ascertained information Info to the user BU, in particular by way of an input apparatus 90, in particular of the system 50.

In the exemplary embodiment shown, the transmitting and/or the outputting of the ascertained information Info to the courier and/or delivery service HL and/or the workshop and/or warehouse operator WL is authorized on the basis of the input by the user BU.

Step b) furthermore involves: ascertaining the information Info relating to the collection and/or the start of the period spent in a workshop and/or in storage if the provided growth characteristic variable WG is characteristic for the plant growth PW falling below a growth limit value WGW. In addition or as an alternative, step b) involves: ascertaining the information Info relating to the end of the period spent in a workshop and/or in storage and/or the delivery if the provided growth characteristic variable WG is characteristic for the plant growth PW reaching and/or exceeding the growth limit value WGW.

In FIG. 1, the provided growth characteristic variable WG is characteristic for the plant growth PW falling below the growth limit value WGW; the growth characteristic variable WG and/or the plant growth PW in particular fall/falls below the growth limit value WGW. The information Info relating to the collection and/or the start of the period spent in a workshop and/or in storage is thus ascertained.

In FIG. 2, the provided growth characteristic variable WG is characteristic for the plant growth PW reaching and/or exceeding the growth limit value WGW; the growth characteristic variable WG and/or the plant growth PW in particular reach/reaches and/or exceed/exceeds the growth limit value WGW. The information Info relating to the end of the period spent in a workshop and/or in storage and/or the delivery is thus ascertained.

The green space and/or cultivated area treatment device 1 is additionally an autonomous mobile green space and/or cultivated area treatment robot 1'.

In addition or as an alternative, in the exemplary embodiment shown, the green space and/or cultivated area treatment device 1 is a lawnmower 1", in particular an autonomous mobile robotic lawnmower 1'. In alternative exemplary embodiments, the green space and/or cultivated area treatment device may be a tiller.

In the exemplary embodiment shown, the space/area 100 is a lawn or grassy space and/or the plant growth PW is growth in the size of a grass plant.

Step a) furthermore involves: detecting the growth characteristic variable WG by way of in particular at least one growth characteristic variable sensor 2a, 2b, in particular of the system 50, in a region B100, in particular at and/or on and/or in the space/area 100.

In the exemplary embodiment shown, a growth characteristic variable sensor 2a is part of a smart home SH, in particular of a weather station of the smart home SH, and/or a growth characteristic variable sensor 2a is part of the charging station 80.

Step a) furthermore involves: detecting the growth characteristic variable WG by way of a, in particular the, growth characteristic variable sensor 2a, 2b of a, in particular the, green space and/or cultivated area treatment device 1, in particular on and/or in the space/area 100.

In detail, step a) involves: detecting the growth characteristic variable WG by way of the growth characteristic variable sensor 2b of a further green space and/or cultivated area treatment device 1b, in particular on and/or in a further space/area 100b in the region B100 of the space/area 100. Step b) in particular involves: ascertaining the information Info, in particular relating to the end of the period spent in a workshop and/or in storage and/or the delivery, on the basis of the detected growth characteristic variable WG, as shown in FIG. 2.

In the exemplary embodiment shown, a growth characteristic variable sensor 2a is part of the, in particular one, green space and/or cultivated area treatment device 1 and/or a growth characteristic variable sensor 2b is part of the further green space and/or cultivated area treatment device 1b.

In the exemplary embodiment shown, the system 50 furthermore comprises the further green space and/or cultivated area treatment device 1b. In alternative exemplary embodiments, the system does not need to or might not comprise the further green space and/or cultivated area treatment device.

In detail, a plant growth PWb has been detected by way of the growth characteristic variable sensor 2b of the further green space and/or cultivated area treatment device 1b after a smaller amount of or no plant growth has been detected by way of the growth characteristic variable sensor 2a of the green space and/or cultivated area treatment device 1, as shown in FIG. 1. The further green space and/or cultivated area treatment device 1b is thus determined or defined as a reference green space and/or cultivated area treatment device and/or the further space/area 100b is determined or defined as a reference space/area.

The growth characteristic variable WG additionally comprises a drive characteristic variable AG, in particular a power consumption PA and/or a variable corresponding to the power consumption, of a drive 3, in particular of a tool drive 3', of a, in particular the and/or further, green space and/or cultivated area treatment device 1, 1b.

In addition or as an alternative, the growth characteristic variable WG comprises a meteorological characteristic variable MG, in particular an air humidity LF, an amount of precipitation NI, an air temperature LT, a global radiation GS and/or an albedo AB, and/or a soil characteristic variable BK, in particular a soil moisture content BF and/or a soil temperature BT.

Again in addition or as an alternative, the growth characteristic variable WG comprises an in particular meteorological and/or phenological season MPJ, in particular spring FR and/or autumn HE.

In FIG. 1, the season MPJ is autumn HE.

In FIG. 2, the season MPJ is spring FR.

In the exemplary embodiment shown, the growth characteristic variable WG comprising the drive characteristic variable AG and/or the meteorological characteristic variable MG is detected by way of the growth characteristic variable sensor 2a of the, in particular one, green space and/or cultivated area treatment device 1 and/or the growth characteristic variable sensor 2b of the further green space and/or cultivated area treatment device 1b. A frequency of warm-up processes of the green space and/or cultivated area treatment robot 1' at the charging station may in particular be an indicator of a low amount of or no plant growth. This is in particular the case against the background that, in cooler weather, the green space and/or cultivated area treatment robot 1' has to warm up at the charging station 80, in particular before it sets off, in particular again.

The growth characteristic variable WG comprising the meteorological characteristic variable MG and/or the soil characteristic variable BK is furthermore ascertained by way of the growth characteristic variable sensor 2a of the charging station 80.

The growth characteristic variable WG comprising the meteorological characteristic variable MG is furthermore detected by way of the growth characteristic variable sensor 2a of the smart home SH.

The growth characteristic variable WG comprising the meteorological characteristic variable MG is furthermore detected and/or provided by way of a weather service 200.

In addition, the drive characteristic variable AG is up-to-date, and/or the meteorological characteristic variable MG is up-to-date and/or for the future, in particular a weather forecast, and/or the soil characteristic variable BK is up-to-date and/or for the future.

Step b) furthermore involves: ascertaining the information Info and/or the plant growth PW on the basis of the drive characteristic variable AG and/or of the meteorological characteristic variable MG and/or of the soil characteristic variable BK and/or of the season MPJ, in particular in combination or linked with one another, in particular and ascertaining the information Info on the basis of the ascertained plant growth PW.

In alternative exemplary embodiments, the growth characteristic variable needs to or might comprise only some of or not all of the abovementioned characteristic variables.

In addition or as an alternative, in alternative exemplary embodiments, the growth characteristic variable may be detected and/or provided, in particular either, by way of the growth characteristic variable sensor of the, in particular one, green space and/or cultivated area treatment device or the growth characteristic variable sensor of the further green space and/or cultivated area treatment device or the growth characteristic variable sensor of the charging station or the growth characteristic variable sensor of the smart home or of the weather service.

The growth characteristic variable WG is furthermore averaged over several days, in particular weeks, and/or several treatment processes of a, in particular the and/or further, space/area 100, 100b, in particular by way of the ascertainment unit 70. The growth characteristic variable WG is in particular averaged over the space/area 100, in particular the region of the space/area B100 and/or the further space/area 100b, in particular by way of the ascertainment unit 70.

The information Info furthermore comprises a route guide to a collection location HO for the collection and/or a delivery location AO for the delivery of the green space and/or cultivated area treatment device 1 and/or an instruction HI relating to the start and/or the end of the period spent in a workshop and/or in storage.

In particular, the green space and/or cultivated area treatment device 1 and the further green space and/or cultivated area treatment device 1b, in particular and at least one further green space and/or cultivated area treatment device 1 of the region B100, may be collected together.

In addition or as an alternative, the reference green space and/or cultivated area treatment device, in the exemplary embodiment shown the further green space and/or cultivated area treatment device 1b, may be delivered, in particular at a time before, the green space and/or cultivated area treatment device 1.

Again in addition or as an alternative, the non-reference green space and/or cultivated area treatment device, in the exemplary embodiment shown the, in particular one, green space and/or cultivated area treatment device 1, in particular and at least one further green space and/or cultivated area treatment device 1 of the region B100, may be delivered together.

Again in addition or as an alternative, the collections, the starts and/or the ends of the periods spent in a workshop and/or in storage and/or the deliveries of the green space and/or cultivated area treatment device 1 and another green space and/or cultivated area treatment device 1c may be different or distributed at different dates or times, in particular in terms of time. Another space/area 100c not in the region B100 or remote from the space/area 100 may in particular be treated and/or need to be treated by way of the other green space and/or cultivated area treatment device 1c.

The method additionally involves: ascertaining a workshop treatment and/or delivery sequence WAR for workshop treatments and/or deliveries of green space and/or cultivated area treatment devices 1 on the basis of, in particular opposite to, a growth sequence WR of a respective last plant growth PW on and/or in spaces/areas 100 treated and/or to be treated by way of the green space and/or cultivated area treatment devices 1 and/or a collection sequence AR of collections for the green space and/or cultivated area treatment devices 1 and/or a start of a period spent in a workshop and/or in storage sequence WLR of starts of periods spent in a workshop and/or in storage for the green space and/or cultivated area treatment devices 1, in particular by way of the ascertainment unit 70. The information Info in particular comprises the ascertained workshop treatment and/or delivery sequence WAR and/or is ascertained on the basis thereof.

In the exemplary embodiment shown, the green space and/or cultivated area treatment device 1 and/or the charging station 80 and/or the smart home SH, in particular each, comprise/comprises the provision unit 60 and/or the ascertainment unit 70 and/or the transmitting and/or output unit 85 and/or the input apparatus 90.

In addition or as an alternative, a user terminal of the user BU, in particular a mobile or portable terminal, such as for example a smartphone or a tablet or a smartwatch, comprises the ascertainment unit 70 and/or the transmitting and/or output unit 85 and/or the input apparatus 90.

Again in addition or as an alternative, a service terminal of the courier and/or delivery service HL, in particular a mobile or portable terminal, such as for example a smartphone or a tablet or a smartwatch, and/or an operator terminal of the workshop and/or warehouse operator WL, in particular a mobile or portable terminal, such as for example a smartphone or a tablet or a smartwatch, or a stationary terminal, such as for example a PC, in particular each, comprise/comprises the ascertainment unit 70 and/or the transmitting and/or output unit 85.

Again in addition or as an alternative, the further green space and/or cultivated area treatment device 1b comprises the provision unit 60 and/or the ascertainment unit 70 and/or the transmitting and/or output unit 85.

Again in addition or as an alternative, the weather service 200 may comprise the provision unit 60 and/or the ascertainment unit 70 and/or the transmitting and/or output unit 85.

In alternative exemplary embodiments, in particular either the green space and/or cultivated area treatment device or the charging station or the smart home or the user terminal or the service terminal or the operator terminal or the further green space and/or cultivated area treatment device or the weather service may comprise the provision unit and/or the ascertainment unit and/or the transmitting and/or output unit and/or the input apparatus.

In the exemplary embodiment shown, the green space and/or cultivated area treatment device 1 and/or the charging station 80 and/or the smart home SH and/or the user BU or the user terminal and/or the courier and/or delivery service HL or the service terminal and/or the workshop and/or warehouse operator WL or the operator terminal and/or the further green space and/or cultivated area treatment device 1b and/or the weather service 200 and/or the provision unit 60 and/or the ascertainment unit 70 and/or the transmitting and/or output unit 85 and/or the input apparatus 90 are furthermore designed to interact, in particular interact, in particular to communicate with one another, in particular to transmit, in particular the, in particular provided and/or detected growth characteristic variable WG and/or the plant growth PW and/or the, in particular ascertained, information Info and/or the input. The interaction may in particular be via a cloud or from cloud to cloud. In addition or as an alternative, the growth characteristic variable WG and/or the plant growth PW and/or the information Info and/or the input may be transmitted from the green space and/or cultivated area treatment device 1 to the charging station 80 in a wired manner and/or be transmitted wirelessly from the charging station 80 to the cloud. Again in addition or as an alternative, transmitting may be performed wirelessly over a short range and/or in the region B100, in particular via WLAN and/or Bluetooth, and/or transmitting may be performed wirelessly over a long range, in particular via mobile radio, such as for example GSM, UMTS and/or LTE.

The outputting may be performed in accordance with a rights and roles concept, in particular via the cloud, such as for example a manufacturer cloud. The rights and roles concept may in particular allow all those involved in providing the service, in particular the user BU, the courier and/or delivery service HL and/or the workshop and/or warehouse operator WL, in particular each, to be able to see/use the data relevant to them.

As made clear by the exemplary embodiments shown and explained above, the invention provides an advantageous method and an advantageous system, in particular each, for ascertaining information relating to a collection, a start and/or an end of a period spent in a workshop and/or in storage and/or a delivery of a green space and/or cultivated area treatment device which, in particular each, have improved properties and/or improved functionalities.

What is claimed is:

1. A method for ascertaining information relating to a collection, a start and/or an end of a period spent in a workshop, in storage, and/or a delivery, of a green space and/or cultivated area treatment device, the method comprising the steps of:

a) automatically providing a growth characteristic variable, wherein the growth characteristic variable is characteristic for plant growth on and/or in a space/area treated and/or to be treated by way of the green space and/or cultivated area treatment device;

b) ascertaining the information on the basis of the provided growth characteristic variable;
c) transmitting and/or outputting the ascertained information to a courier and/or delivery service, a workshop, a warehouse operator and/or a user, of the green space and/or cultivated area treatment device;
wherein step b) comprises:
ascertaining the information relating to the collection and/or the start of the period spent in the workshop and/or in the storage if the provided growth characteristic variable is characteristic for the plant growth falling below a growth limit value, and/or
ascertaining the information relating to the end of the period spent in the workshop, the storage and/or the delivery if the provided growth characteristic variable is characteristic for the plant growth reaching and/or exceeding a growth limit value;
wherein step a) comprises:
automatically detecting the growth characteristic variable by way of a growth characteristic variable sensor in a region of the space/area;
wherein the growth characteristic variable is averaged over several days or weeks, and/or several treatment processes of the space/area,
wherein the information comprises an instruction relating to the start and/or the end of the period spent in a workshop and/or in storage, and
wherein the green space and/or cultivated area treatment device is an autonomous mobile green space robotic lawnmower.

2. The method according to claim 1, further comprising:
releasing, delaying and/or blocking the transmitting and/or the outputting of the ascertained information to the courier, the delivery service, the workshop and/or the warehouse operator, on the basis of an input by the user.

3. The method according to claim 2, wherein the input by the user is at a time after the transmitting and/or the outputting of the ascertained information to the user.

4. The method according to claim 1, wherein step a) comprises:
detecting the growth characteristic variable by way of the growth characteristic variable sensor of a green space and/or cultivated area treatment device in the region of the space/area.

5. The method according to claim 4, wherein step a) comprises:
detecting the growth characteristic variable by way of the growth characteristic variable sensor of a further green space and/or cultivated area treatment device on and/or in a further space/area in the region of the space/area, and
wherein step b) comprises: ascertaining the information relating to the end of the period spent in a workshop and/or in storage and/or the delivery, on the basis of the detected growth characteristic variable.

6. The method according to claim 5,
wherein a plant growth has been detected by way of the growth characteristic variable sensor of the further green space and/or cultivated area treatment device after a smaller amount of, or no, plant growth has been detected by way of a growth characteristic variable sensor of the green space and/or cultivated area treatment device.

7. The method according to claim 1, wherein at least one of:
the growth characteristic variable comprises a drive characteristic variable of a drive of the green space and/or cultivated area treatment device,
the growth characteristic variable comprises a meteorological characteristic variable and/or a soil characteristic variable, or
the growth characteristic variable comprises a meteorological and/or phenological season.

8. The method according to claim 7, wherein
the drive characteristic variable is a power consumption and/or a variable corresponding to the power consumption, of a tool drive of the green space and/or cultivated area treatment device,
the meteorological characteristic variable is an amount of precipitation, an air temperature, a global radiation and/or an albedo,
the soil characteristic variable is a soil moisture content and/or a soil temperature,
the meteorological and/or phenological season is spring and/or autumn.

9. The method according to claim 1, wherein the information further comprises:
a route guide to a collection location for the collection, and/or
a delivery location for the delivery of the green space and/or cultivated area treatment device.

10. The method according to claim 1, further comprising:
ascertaining a workshop treatment and/or delivery sequence for workshop treatments and/or deliveries of green space and/or cultivated area treatment devices on the basis of a growth sequence of a respective last plant growth on and/or in spaces/areas treated and/or to be treated by way of the green space and/or cultivated area treatment devices, and/or a collection sequence of collections for the green space and/or cultivated area treatment devices, and/or a start of a period spent in a workshop and/or in storage sequence of starts of periods spent in a workshop and/or in storage for the green space and/or cultivated area treatment devices.

11. A system for ascertaining information relating to a collection, a start and/or an end of a period spent in a workshop, in storage, and/or a delivery, of a green space and/or cultivated area treatment device, the system comprising:
a provision unit, wherein the provision unit is designed to automatically provide a growth characteristic variable, wherein the growth characteristic variable is characteristic for plant growth on and/or in a space/area treated and/or to be treated by way of the green space and/or cultivated area treatment device;
a growth characteristic sensor for automatically detecting the growth characteristic variable in a region of the space/area;
an ascertainment unit, wherein the ascertainment unit is designed to ascertain the information on the basis of the provided growth characteristic variable, including:
ascertaining the information relating to the collection and/or the start of the period spent in the workshop and/or in the storage if the provided growth characteristic variable is characteristic for the plant growth falling below a growth limit value, and/or
ascertaining the information relating to the end of the period spent in the workshop, the storage and/or the delivery if the provided growth characteristic variable is characteristic for the plant growth reaching and/or exceeding a growth limit value;

a transmitting and/or output unit for transmitting and/or outputting the ascertained information to a courier and/or delivery service, a workshop, a warehouse operator and/or a user, of the green space and/or cultivated area treatment device;

wherein the growth characteristic variable is averaged over several days or weeks, and/or several treatment processes of the space/area, wherein the information comprises an instruction relating to the start and/or the end of the period spent in a workshop and/or in storage, and wherein the green space and/or cultivated area treatment device is an autonomous mobile green space robotic lawnmower.

12. The system according to claim 11, further comprising:

the green space and/or cultivated area treatment device, and/or a charging station for charging the green space and/or cultivated area treatment device.

* * * * *